United States Patent
Kojima et al.

(10) Patent No.: US 11,796,869 B2
(45) Date of Patent: *Oct. 24, 2023

(54) DEVICE WITH IMAGING UNIT

(71) Applicant: Japan Display Inc., Minato-ku (JP)

(72) Inventors: Tetsuya Kojima, Minato-ku (JP); Mitsutaka Okita, Minato-ku (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/530,906

(22) Filed: Nov. 19, 2021

(65) Prior Publication Data

US 2022/0075233 A1  Mar. 10, 2022

Related U.S. Application Data

(63) Continuation of application No. 17/010,924, filed on Sep. 3, 2020, now Pat. No. 11,209,703.

(30) Foreign Application Priority Data

Sep. 10, 2019  (JP) ................................. 2019-164577

(51) Int. Cl.
*G02F 1/1343* (2006.01)
*G02F 1/133* (2006.01)
*H04N 23/54* (2023.01)
*H04N 23/57* (2023.01)

(52) U.S. Cl.
CPC .... *G02F 1/134363* (2013.01); *G02F 1/13306* (2013.01); *H04N 23/54* (2023.01); *H04N 23/57* (2023.01); *G02F 2201/123* (2013.01)

(58) Field of Classification Search
CPC ... H04N 5/2257; H04N 23/57; H04M 1/0264; G02F 1/294; G02F 1/134363
See application file for complete search history.

(56) References Cited

U.S. PATENT DOCUMENTS 11,209,703 B2 * 12/2021 Kojima ............... G02F 1/13306
2016/0274423 A1 * 9/2016 Kashiwagi ............. G02B 30/28
2019/0089880 A1 * 3/2019 Murao ................... G02F 1/1339

* cited by examiner

*Primary Examiner* — Jessica M Merlin
(74) *Attorney, Agent, or Firm* — Maier & Maier, PLLC

(57) ABSTRACT

A display device comprises a liquid crystal panel including a plurality of pixels and an imaging device arranged on a back side of the liquid crystal panel. The imaging device has an imaging region overlaps with the imaging device and the other region other than the imaging region in a plan view. A plurality of linear electrodes is arranged separately from each other in the imaging region. Among the plurality of linear electrodes, a first pair of linear electrodes are separated by a first interval and a second pair of linear electrodes are separated by a second interval different from the first interval in a plan view. The first pair of linear electrodes and the second pair of linear electrodes are irregularly arranged.

6 Claims, 8 Drawing Sheets

P1 < P2 < P3

DEVICE WITH IMAGING UNIT

CROSS REFERENCE TO RELATED APPLICATIONS

This application is a continuation of U.S. application Ser. No. 17/010,924 filed Sep. 3, 2020, and which is based on and claims the benefit of priority from the prior Japanese Patent Application No. 2019-164577, filed on Sep. 10, 2019, the entire contents of each of which are incorporated herein by reference.

FIELD

An embodiment of the present invention relates to a display device including an imaging device.

BACKGROUND

In recent years, most portable information terminals such as smartphones have an imaging device for taking photographs and moving images. Normally, the imaging device has an imaging device on the rear side (opposite side to a display screen) called an out-camera and an imaging device on the display screen side called an in-camera. The out-camera is used when taking a landscape photograph or a third person. On the other hand, the in-camera is used when the user himself/herself is a subject. Since the imaging device for the in-camera is arranged on the display screen side, usually arranged to avoid a display region. Therefore, a region provided with the imaging device for the in-camera cannot be used as the display region, and there was a limit to the expansion of the display screen.

On the other hand, an attempt has been made to image a subject facing the display screen by arranging a camera on the rear side of the display device. For example, Japanese laid-open patent publication No. 2007-163816 discloses a display device in which a camera unit is arranged on the rear side of a transmission type liquid crystal panel. A display device of Japanese laid-open patent publication No. 2007-163816 usually performs an image display on a region in front of the camera unit, at the time of photographing, performs an imaging process by performing a black display on the region in front of the camera unit. Thus, the display device of Japanese laid-open patent publication No. 2007-163816, using the camera unit arranged on the rear side of the display device, it is possible to image the subject facing the display screen.

SUMMARY

A display device comprises a liquid crystal panel including a plurality of pixels and an imaging device arranged on a back side of the liquid crystal panel. The imaging device has an imaging region overlaps with the imaging device and the other region other than the imaging region in a plan view. A plurality of linear electrodes is arranged separately from each other in the imaging region. Among the plurality of linear electrodes, a first pair of linear electrodes are separated by a first interval and a second pair of linear electrodes are separated by a second interval different from the first interval in a plan view. The first pair of linear electrodes and the second pair of linear electrodes are irregularly arranged.

DESCRIPTION OF EMBODIMENTS

Figure 1:
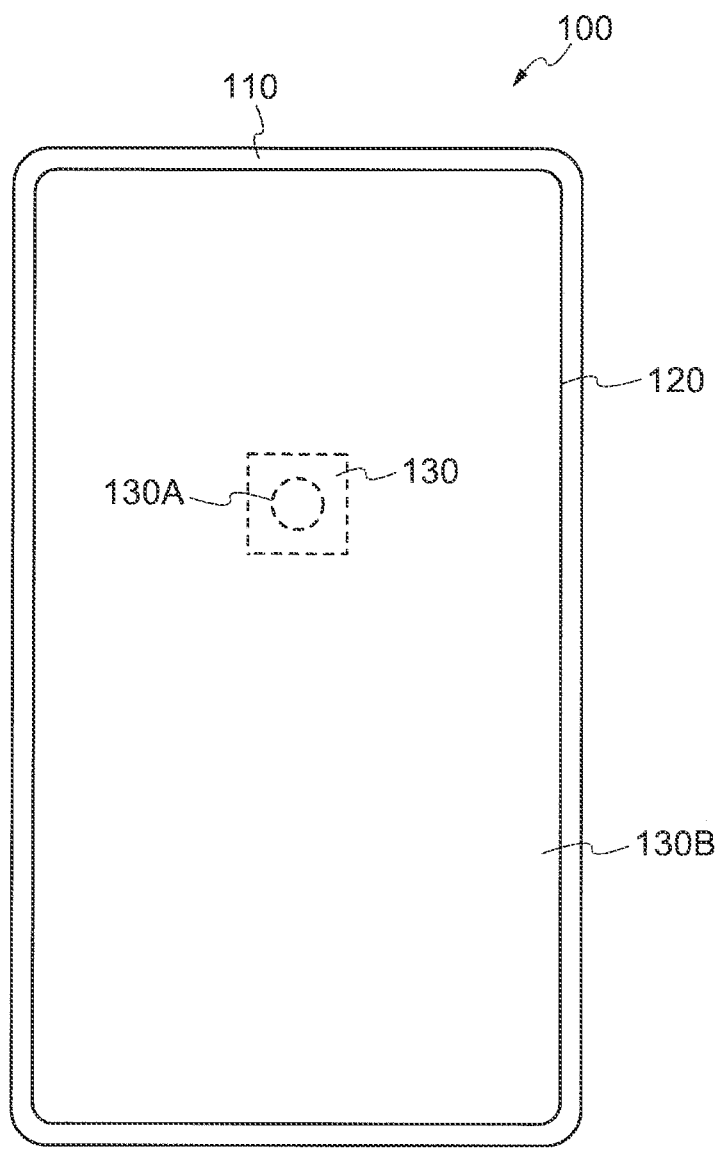
FIG. 1 is a plan view showing an external view of a display device of the first embodiment.

As in a display device described in Japanese laid-open patent publication 2007-163816, in a structure of arranging a camera unit on a rear side of a liquid crystal panel, an image of an imaging target passes through the liquid crystal panel and is incident on the camera unit. At this time, light incident on the liquid crystal panel will be diffracted by a plurality of pixels, there is a problem that a captured image is deteriorated. Specifically, in each sub-pixel corresponding to the RGB colors, there is a problem that diffraction occurs when the light of the RGB colors is incident, and a ghost (specifically interference fringes) occurs around the image of the imaging target.

One object of an embodiment of the present invention is to reduce the occurrence of the ghost in the captured image in the display device of performing imaging through the liquid crystal panel.

Hereinafter, embodiments of the present invention will be described referring to the drawings and the like. However, the present invention can be implemented in various modes without departing from the gist thereof and should not be construed as being limited to the description of the following exemplary embodiments. For the sake of clarity of explanation, the drawings may be schematically represented with respect to widths, thicknesses, shapes, and the like of the respective portions in comparison with actual embodiments, but the drawings are only examples and are not intended to limit the interpretation of the present invention. In this specification and each drawing, elements having the same functions as those described with reference to the preceding drawings are denoted by the same reference numerals, and a repetitive description thereof may be omitted.

In this specification and the claims, "surface side" refers to the side constituting the display screen in the display device, and "back surface side" refers to the side opposing the surface side. "Upper" and "lower" in a cross-sectional view refer to a relative positional relationship based on the imaging device. For example, in this specification, the direction from the imaging device to the liquid crystal panel is defined as "up" and the opposite direction is defined as "down". In the present specification and claims, when expressing a mode of arranging another structure on a certain structure, it is intended to include both the case of arranging the other structure directly above the structure so as to be in contact with the certain structure and the case of arranging the other structure above the certain structure via the still another structure, unless otherwise specified.

First Embodiment

A display device 100 according to the first embodiment of the present invention will be described. In this embodiment, the display device 100 is a portable terminal having a liquid crystal panel.

FIG. 1 is a plan view showing an external view of the display device 100 according to the first embodiment. As shown in FIG. 1, the display device 100 of the present embodiment includes a housing 110, a display screen 120, and an imaging unit 130. The housing 110 houses a liquid crystal panel 200 which will be described later and a group of circuits to drive the liquid crystal panel 200 and control the portable terminal. The display screen 120 is an interface to display images. The display screen 120 is a surface of the liquid crystal panel 200 housed in the housing 110. The surface of the liquid crystal panel 200 functions as the display screen 120 by the surface of the liquid crystal panel 200 is visually recognized through a cover glass or the like. The imaging unit 130 includes an imaging device 132 to be described later and a control unit (not shown) to image the incident light detected by the imaging device 132 as an image.

The imaging unit 130 is housed inside the housing 110 and is arranged back surface side of the liquid crystal panel 200. That is when a user's viewpoint is used as a reference, the imaging unit 130 is arranged on the backside of the display screen 120 and cannot be visually recognized by the user. In this specification, a region of the liquid crystal panel 200 in a planar view that overlaps with the part where the imaging device 132 of the imaging unit 130 is arranged is referred to as "an imaging region 130A". In the display device 100 of the present embodiment, unlike regions (i.e., a display region 130B) other than the imaging region 130A, the imaging region 130A does not display images.

Figure 2:
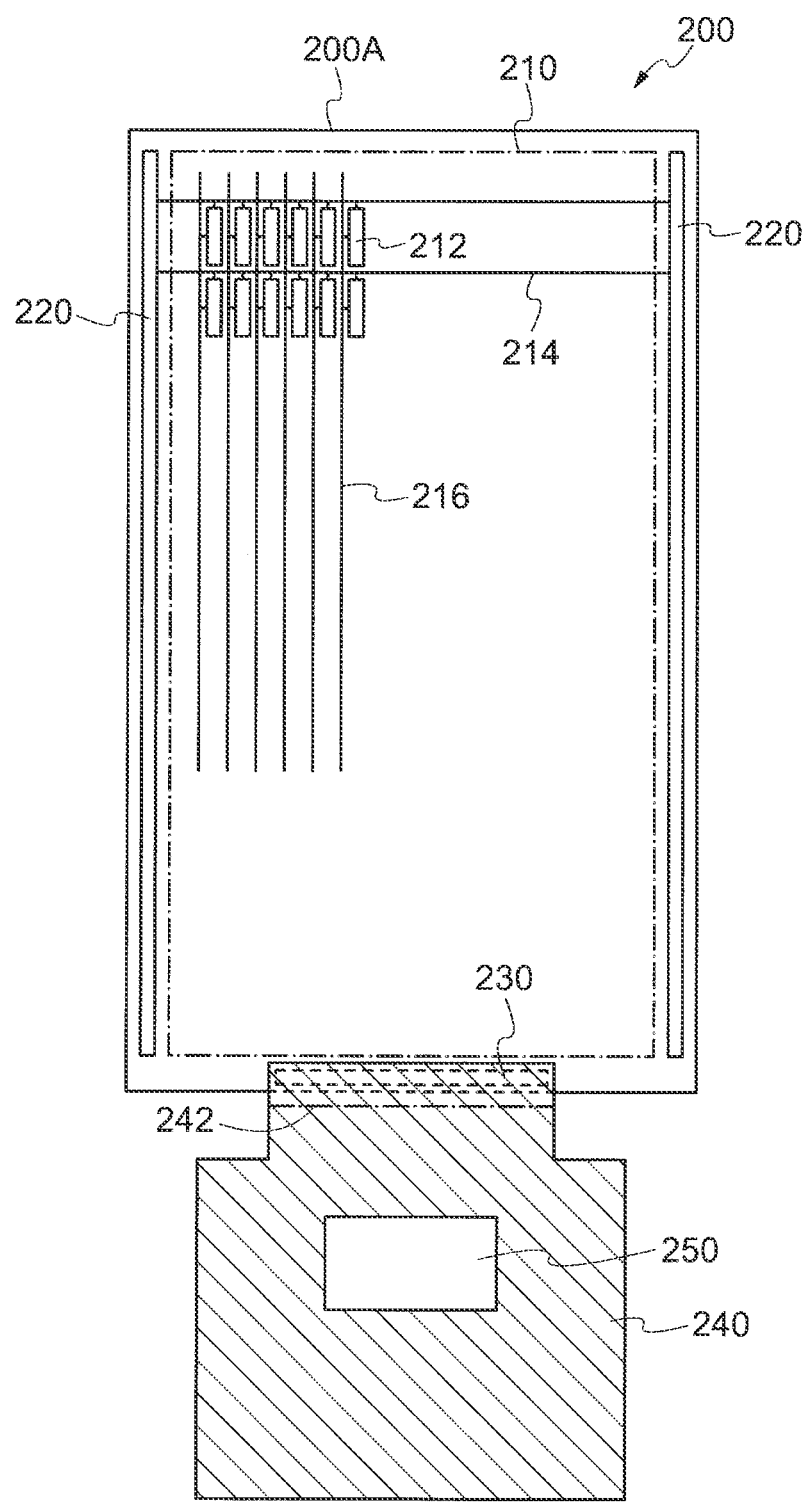
FIG. 2 is a plan view showing a configuration of a liquid crystal panel of the first embodiment.

FIG. 2 is a plan view showing a configuration of the liquid crystal panel 200 of the first embodiment. However, for convenience of explanation, a circuit substrate 200A of the liquid crystal panel 200 is shown in FIG. 2, and a liquid crystal layer 200B and a counter substrate 200C which will be described later are omitted.

As shown in FIG. 2, a display circuit 210, a scanning signal line driving circuit 220, and a terminal part 230 are provided on the surface side of the circuit substrate 200A of the liquid crystal panel 200. The circuit substrate 200A is a substrate in which a plurality of switching elements such as a thin film transistor is arranged on a support substrate having light transmittance. The circuit substrate 200A may also be referred to as an active matrix substrate. As the support substrate constituting the circuit substrate 200A, glass substrate or a resin substrate having flexibility can be used.

The display circuit 210 is a circuit to control a plurality of pixels 212 that displays images. Specifically, the display circuit 210 includes a plurality of scanning signal lines 214 extending in a row direction and a plurality of video signal lines 216 extending in a column direction, each of the intersections of the plurality of scanning signal lines 214 and the plurality of video signal lines 216 has the pixel 212 including the switching element such as the thin film transistor. In the present embodiment, the individual pixel 212 is a sub-pixel corresponding to one of the colors of R (red), G (green) and B (blue). Therefore, the display circuit 210 is actually configured to display colors in units of one pixel (main pixel) including the three pixels 212 corresponding to each color of RGBs. A region in which the display circuit 210 provided approximately matches a region in which the plurality of pixels 212 provided. That is, in the liquid crystal panel 200 in planar view, the region in which the display circuit 210 provided corresponds to the display region 130B shown in FIG. 1. Here, the schematic configuration of the respective pixel 212 will be described referring to FIG. 3.

Figure 3:
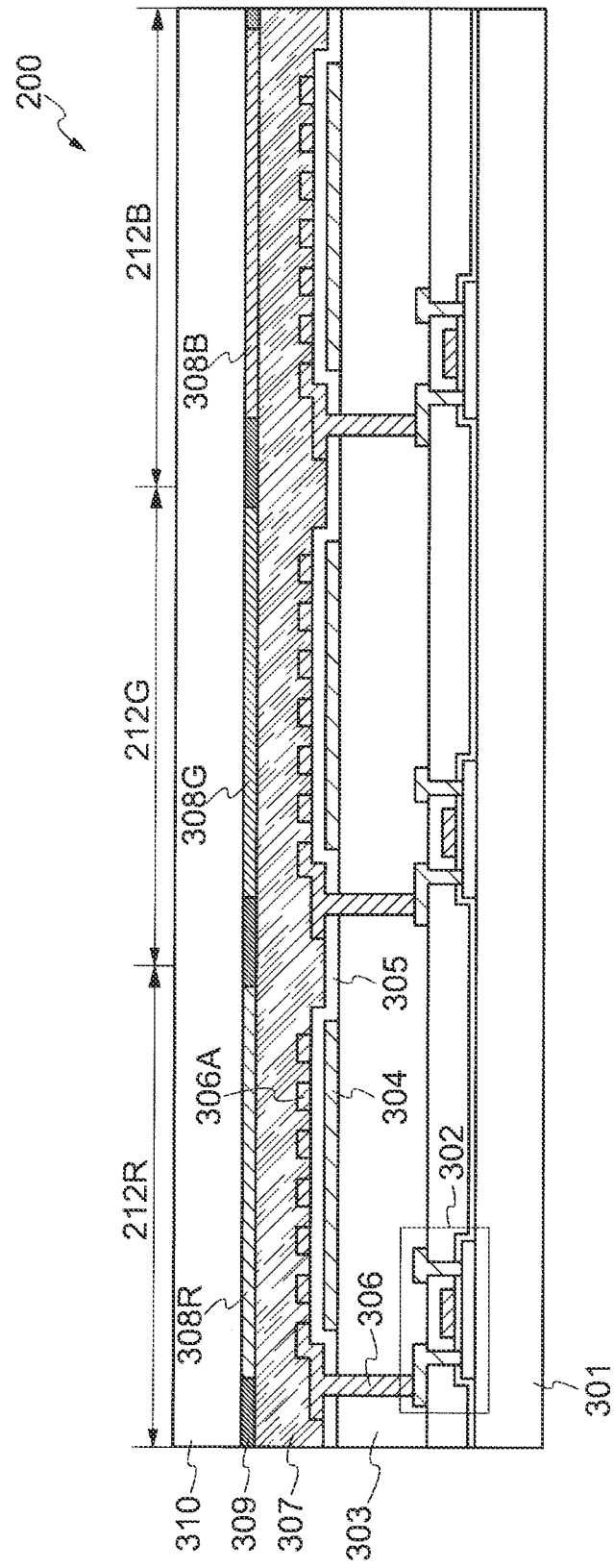
FIG. 3 is a cross-sectional view showing a configuration of a pixel in a liquid crystal panel of the first embodiment.

FIG. 3 is a cross-sectional view showing a configuration of the pixel 212 in the liquid crystal panel 200 of the first embodiment. In FIG. 3, the three pixels 212 corresponding to the RGB colors are provided. Specifically, a pixel corresponding to red (hereinafter referred to as "R pixel 212R"), a pixel corresponding to green (hereinafter referred to as "G pixel 212G"), and a pixel corresponding to blue (hereinafter referred to as "B pixel 212B") are provided on the support substrate 301. Here, the R pixel 212R will be described, and the G pixel 212G and the B pixel 212B will be described focusing on portions different from the R pixel 212R.

The R pixel 212R includes a thin film transistor 302 as the switching element. Above a planarization film 303 covering the thin film transistor 302, a common electrode 304 is arranged. Above the common electrode 304, a pixel electrode 306 is arranged via an insulating layer 305. The pixel electrode 306 is electrically connected to the thin film transistor 302 via an opening provided in the planarization film 303 and the insulating layer 305. In the present embodiment, the common electrode 304 and the pixel electrode 306 are composed of a transparent conductive film made of, for example, a metallic oxide such as ITO (Indium Tin Oxide) as a material.

In the present embodiment, a part of the pixel electrode 306 arranged on the common electrode 304 is processed into a comb-tooth shape. That is although FIG. 3 shows that the plurality of pixel electrodes 306 is provided, in practice, the pixel electrode 306 in a planar view has a comb-like pattern shape. Specifically, the pixel electrode 306 in a planar view has a configuration that a plurality of linear electrodes 306A arranged adjacent to each other mutually connected at each end portion.

When a voltage is applied between the common electrode 304 and the pixel electrode 306, an electric field of transverse direction (called a fringe electric field) is formed between them. In this embodiment, the fringe electric field is used to control an orientation of liquid crystal molecules (not shown) contained in a liquid crystal layer 307. Such a control method of the liquid crystal molecules is also called an FFS (Fringe Field Switching) method.

A color filter corresponding to red (hereinafter referred to as "R filter 308R") is arranged on the pixel electrode 306 via the liquid crystal layer 307. The R filter 308R is provided in a counter substrate 310. Similarly, a color filter (hereinafter referred to as "G filter 308G") corresponding to green is arranged in the G pixel 212G. A color filter corresponding to blue (hereinafter referred to as "B filter 308B") is arranged in the B pixel 212B. A light shielding film 309 is respectively provided between the R filter 308R, the G filter 308G, and the B filter 308B.

As described above, the R pixel 212R, the G pixel 212G, and the B pixel 212B are respectively provided in the R filter 308R, the G filter 308G, and the B filter 308B. Therefore, light from a backlight unit 260 (reference FIG. 4) arranged on a back surface side of the liquid crystal panel 200 is separated into light of R, G, and B colors by the R filter 308R, the G filter 308G, and the B filter 308B.

Returning to FIG. 2 and explanation will be continued. The scanning signal line driving circuit 220 is coupled to the scanning signal line 214 and carries a scanning signal to the scanning signal line 214. Specifically, the scanning signal is applied to a gate of the thin film transistor (not shown) included in the pixel 212 and is used for switching control of the thin film transistor. In the present embodiment, similarly to the plurality of pixels 212, the scanning signal line driving circuit 220 is also formed using the thin film transistor. However, the scanning signal line driving circuit 220 can also be substituted by an IC chip or the like. In the present embodiment, the circuit substrate 200A includes two scanning signal line driving circuits 220, but only one of them may be used.

The terminal part 230, although not shown, is an assembly of a plurality of terminals connected to the scanning signal line driving circuit 220 and the plurality of video signal lines 216. The terminal part 230 is arranged outside the display circuit 210. An externally supplied video signal and a control signal are provided to the display circuit 210 or the scanning signal line driving circuit 220 via the terminal part 230.

The liquid crystal panel 200 is connected to a flexible printed circuit substrate 240 via the terminal part 230. The flexible printed circuit substrate 240 is an interface substrate to connect the circuit substrate 200A of the liquid crystal panel 200 to the external control circuit (not shown). In this embodiment, a display control circuit 250 is mounted on the flexible printed circuit substrate 240. The display control circuit 250 is a signal processing circuit that processes various control signals transmitted to the scanning signal line driving circuit 220 and video signals transmitted to the video signal line 216. In this embodiment, the display control circuit 250 is mounted on the flexible printed circuit substrate 240 in the form of an IC chip.

The flexible printed circuit substrate 240 can be folded because it is a circuit substrate printed with a wiring on top of a flexible substrate made of a resin material. In the present embodiment, the flexible printed circuit substrate 240 can be fold by a dashed line 242 so that the flexible printed circuit substrate 240 and the back surface side of the circuit substrate 200A (the side on which the display circuit 210 or the like is not formed) overlap with each other. This allows the liquid crystal panel 200 and the flexible printed circuit substrate 240 to be compactly housed inside the housing 110.

Figure 4:
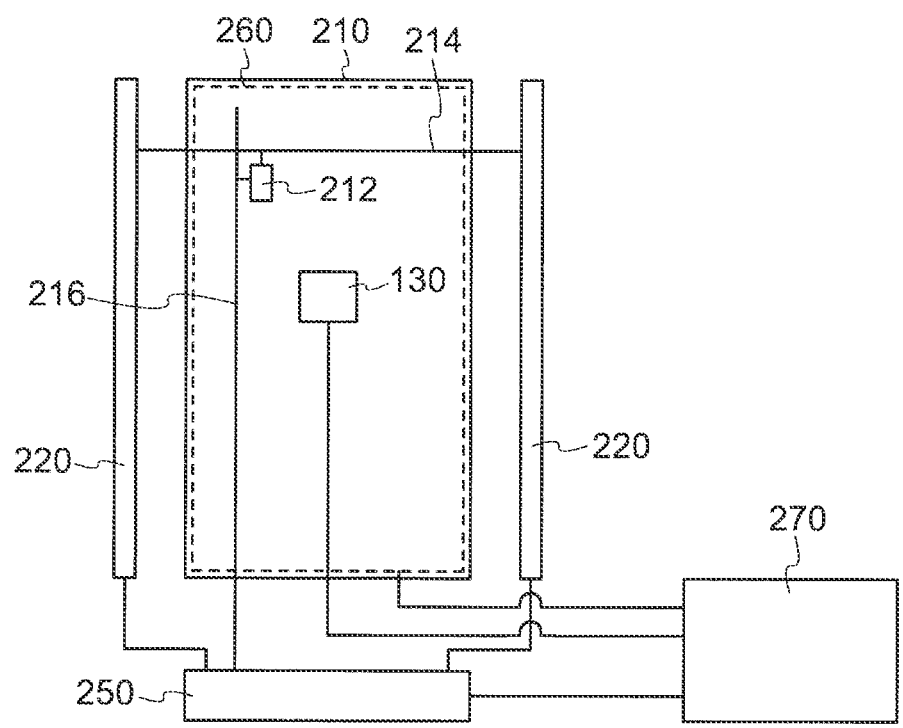
FIG. 4 is a diagram explaining a schematic of a circuit configuration in a display device of the first embodiment.

FIG. 4 is a diagram for explaining a schematic of a circuit configuration in the display device 100 of the first embodiment. As described above, the various control signals transmitted to the scanning signal line driving circuit 220 are processed by the display control circuit 250. The display control circuit 250 may generate a control signal such as a start pulse or may perform a predetermined signal processing to the control signal acquired from an external system control circuit 270. The display control circuit 250 may also perform a predetermined signal processing on the video signal acquired from the system control circuit 270.

The system control circuit 270 collectively controls the display control circuit 250, the backlight unit 260, and the imaging unit 130. The backlight unit 260 includes a light source 269 (refer to FIG. 5) and a backlight control circuit (not shown) of the liquid crystal panel 200.

In this embodiment, the system control circuit 270 synchronizes operation of the imaging unit 130, operation of the display circuit 210, and operation of the backlight unit 260. For example, the system control circuit 270 controls the display circuit 210 to display images throughout the display region 130B when the imaging unit 130 is not in use. On the other hand, when using the imaging unit 130, the system control circuit 270 controls the display circuit 210 so that a liquid crystal layer located in the imaging region 130A is optically transparent. However, not limited to this example, the system control circuit 270 can also control the display circuit 210 so that the liquid crystal layer located in the imaging region 130A is always transparent to light while displaying images in the display region 130B. Further, the system control circuit 270 may control the display circuit 210 so that the liquid crystal layer located in the imaging region 130A transmits light (specifically, transmits light when the imaging unit 130 is activated) in conjunction with the operation of the imaging unit 130 while displaying images on the display region 130B. Specific controls by the system control circuit 270 will be described later.

Figure 5:
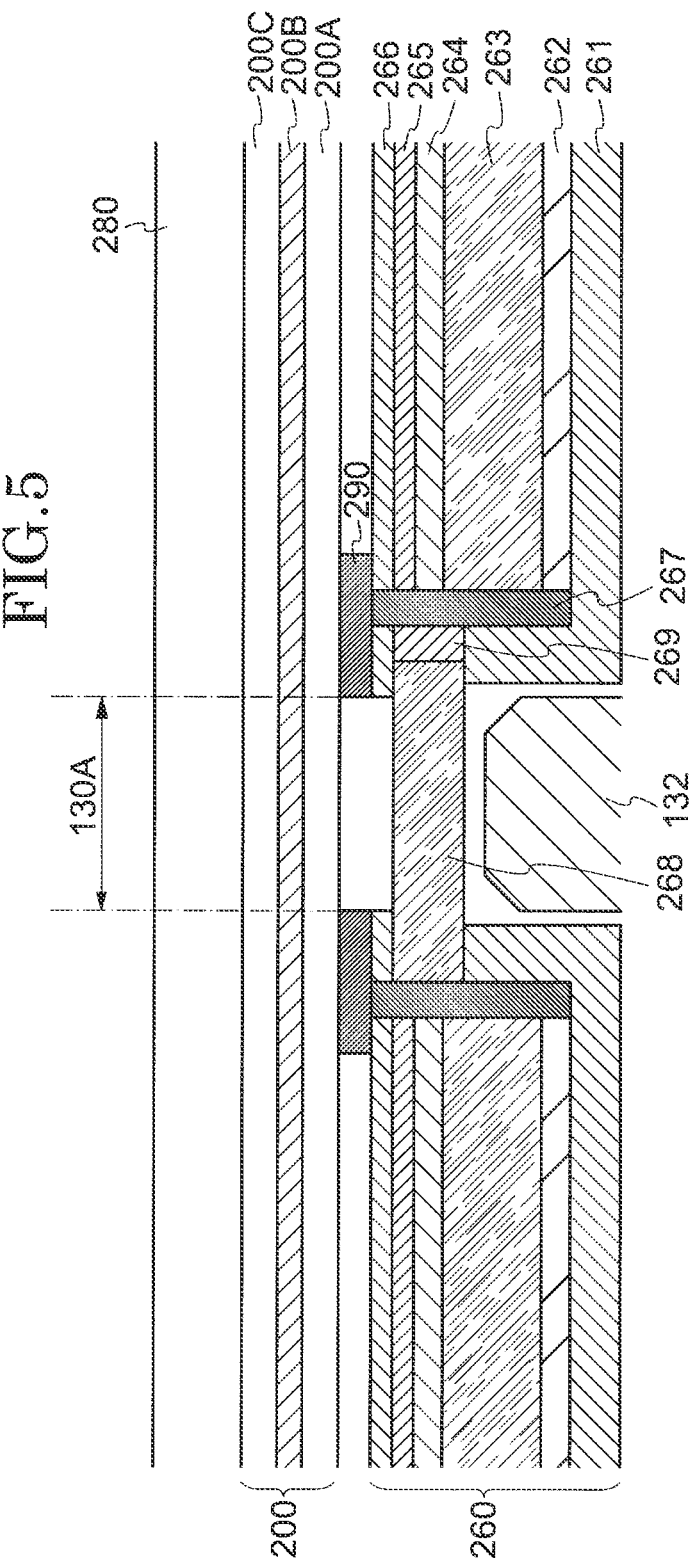
FIG. 5 is a cross-sectional view showing a configuration near an imaging region in a display device of the first embodiment.

FIG. 5 is a cross-sectional view showing a configuration in the vicinity of the imaging region 130A in the display device 100 according to the first embodiment. Specifically, FIG. 5 corresponds to a cross-sectional view in which the imaging region 130A and the display region 130B shown in FIG. 1 are cut. The liquid crystal panel 200 includes the circuit substrate 200A, the liquid crystal layer 200B and the counter substrate 200C. A cover glass 280 is provided on the liquid crystal panel 200. Although not shown, the upper and lower surfaces of the liquid crystal panel 200, optical films such as a polarization plate is arranged.

The backlight unit 260 is adhered to the lower surface of the liquid crystal panel 200 by using an adhesive film 290 having a light shielding property. As shown in FIG. 5, the adhesive film 290 has an opening at a position corresponding to the imaging region 130A. Therefore, the imaging process by the imaging unit 130 is not obstructed by the adhesive film 290.

The backlight unit 260 includes a mold member 261, a reflection sheet 262, a first light guide plate 263, a diffusion sheet 264, a first prism sheet 265, a second prism sheet 266, a light shielding wall 267, a second light guide plate 268, the light source 269 and the backlight control circuit (not shown). However, any of the component described here is an example, the configuration of the backlight unit 260 is not limited to the configuration of FIG. 5.

The backlight unit 260 of the present embodiment includes the first light guide plate 263 provided over substantially the entire area of the display circuit 210 (i.e., substantially the entire area of the display region 130B) and the second light guide plate 268 provided locally corresponding to the imaging region 130A. A light source for the display region 130B (not shown) is provided on the side of the first light guide plate 263. The light source 269 for the imaging region 130A is provided on side of the second light guide plate 268. The light source 269 arranged on side of light source and the second light guide plate 268 arranged on side of the first light guide plate 263 are both LED light sources and can be controlled independently of each other.

As shown in FIG. 5, between the first light guide plate 263 and the second light guide plate 268, the light shielding wall 267 is arranged. Therefore, a light transmitted inside the first light guide plate 263 does not affect the imaging region 130A. Therefore, the display device 100 can locally darken only the imaging region 130A. For example, in normal image display, light is incident on both the first light guide plate 263 and the second light guide plate 268 to display an image on the entire area of the display region 130B and brighten the imaging region 130A. On the other hand, when performing imaging using the imaging device 132, the light is incident on only the first light guide plate 263 with turning off the light source 269, the imaging region 130A of the display screen 120 can be locally darkened to be imageable state.

When imaging, the imaging region 130A can be darkened by turning off the light source 269 in synchronization with the operation of the imaging device 132, but a liquid crystal layer located inside the imaging region 130A must be transited to a transmissive state (light transmitting state). That is, it is required that the light from the subject located in front of the display screen 120 can be incident on the imaging device 132. In the present embodiment, the liquid crystal layer is controlled by providing the imaging region 130A with a plurality of linear electrodes having a configuration different from that of the display region 130B.

Figure 6:
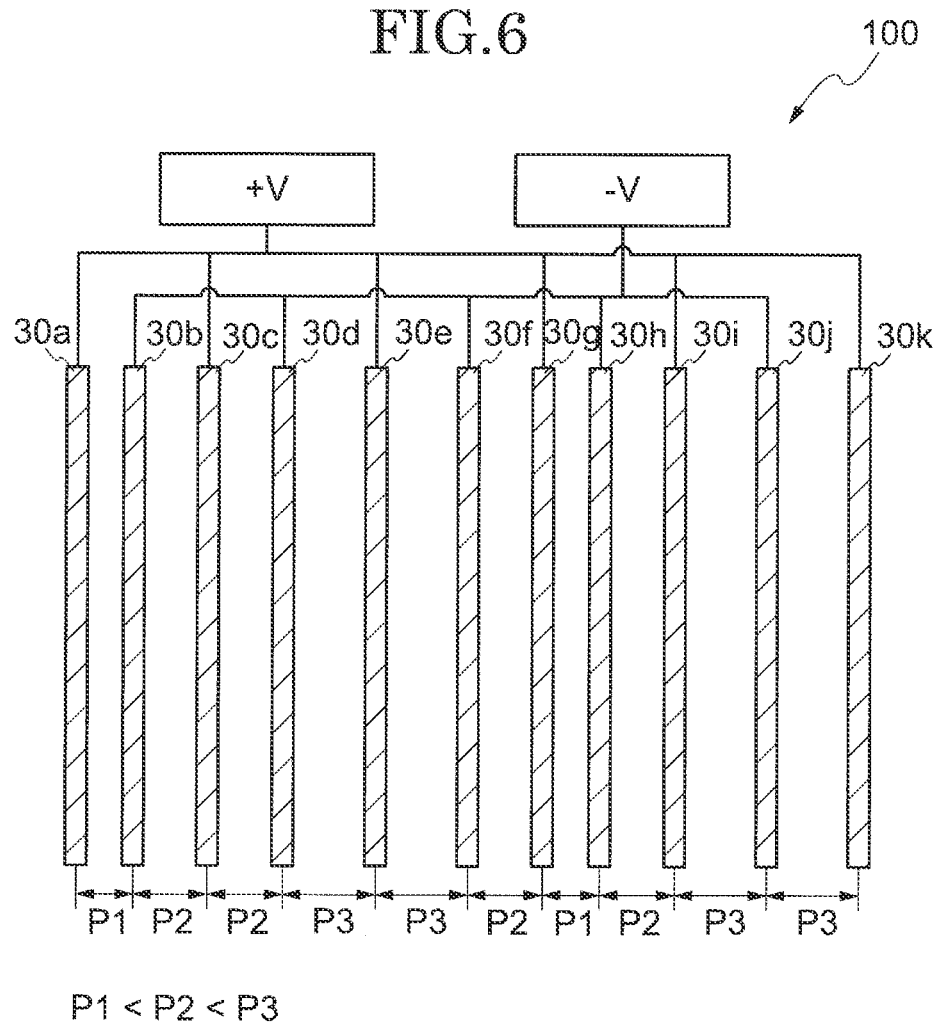
FIG. 6 is a plan view schematically showing a configuration of an imaging region in a liquid crystal panel of the first embodiment.

FIG. 6 is a plan view schematically showing a configuration of the imaging region 130A in the display device 100 according to the first embodiment. As shown in FIG. 6, in the imaging region 130A, a plurality of linear electrodes 30a to 30k is arranged separately from each other. The line widths of the plurality of linear electrodes 30a to 30k may be, for example, 2 micrometers, but are not limited thereto. The plurality of linear electrodes 30a to 30k can be composed of a transparent conductive film made of a metallic oxide such as, for example, ITO (Indium Tin Oxide). However, the present invention is not limited thereto, the plurality of linear electrodes 30a to 30k may be composed of a conductive film using a metallic material for example, aluminum, silver, or copper and the like. In this embodiment, the linear electrodes 30a, 30c, 30e, 30g, 30i, and 30k are formed by the same transparent conductive film as the common electrode 304 shown in FIG. 3. The linear electrodes 30b, 30d, 30f, 30h, and 30j are formed by the same transparent conductive film as the pixel electrode 306.

In the present embodiment, a positive power supply voltage (+V) is supplied to the linear electrodes 30a, 30c, 30e, 30g, 30i, and 30k, and is a negative power supply voltage (−V) is supplied to the linear electrodes 30b, 30d, 30f, 30h, and 30j. However, in the present embodiment, since the so-called frame inversion method is adopted, the linear electrodes to which the positive power supply voltage is supplied and the linear electrodes to which a negative power supply voltage is supplied are reversed in each frame (units of the image display).

In the present embodiment, by forming a voltage difference (E) of ±2V volts between the linear electrodes 30a to 30k, an electric field of transverse direction is formed between the linear electrodes 30a to 30k. The formed electric field of transverse direction is used to control the orientation of the liquid crystal layer 200B in the imaging region 130A. As a result, the liquid crystal layer 200B in the imaging region 130A can be used as an optical shutter. Orientation control scheme of the liquid crystal layer using the electric field of transverse direction is generally called the IPS (In-Plane-Switching) scheme. In the present embodiment, since the liquid crystal layer 200B in the imaging region 130A is used as the optical shutter, the liquid crystal layer 200B is oriented to transmit light at the time of imaging.

According to the findings of the present inventors, when the liquid crystal layer 200B transitions to the transmissive state, if the plurality of linear electrodes 30a to 30k is arranged at equal intervals, the light passing through the imaging region 130A is diffracted, and a ghost occurs around the image of the imaging target. Therefore, in the present embodiment, as shown in FIG. 6, the interval of the plurality of linear electrodes 30a to 30k is intentionally irregularly distributed to reduce the generation of ghosts. The term "interval" here refers to interval of the center line of the respective linear electrodes. In this specification, this interval may be referred to as "transmission pitch".

For example, in FIG. 6, interval between the linear electrode 30a and the linear electrode 30b is set to a first interval (P1), interval between the linear electrode 30b and the linear electrode 30c is set to s second interval (P2), and interval between the linear electrode 30d and the linear electrode 30e is set to a third interval (P3). As shown in FIG. 6, the interval P1, the interval P2, and the interval P3 are intervals differing from each other, and there is a relation of P1<P2<P3. For example, the first interval P1 may be 5 μm, the second interval P2 may be 10 μm, and the third interval P3 may be 20 μm. However, the specific numerical values of the first interval P1, the second interval P2, and the third interval P3 are not limited to these examples.

In the present embodiment, a plurality of intervals (transmission pitches) differing from each other are randomly distributed in the imaging region 130A. That is, in the imaging region 130A, the first interval P1, the second interval P2, and the third interval P3 are irregularly arranged. In the present embodiment, a pair of linear electrodes separated by the first interval may be referred to as a "first pair of linear electrodes," a pair of linear electrodes separated by the second interval may be referred to as a "second pair of linear electrodes," and a pair of linear electrodes separated by the third interval may be referred to as a "third pair of linear electrodes." Using these expressions, the examples shown in this embodiment can be said that the first pair of linear electrodes, the second pair of linear electrodes, and the third pair of linear electrodes are irregularly arranged in the imaging region 130A. In the present embodiment, an example that three intervals of the first interval P1, the second interval P2, and the third interval P3 provided is shown, but the present invention is not limited to three as long as two or more intervals are provided.

As described above, the display device 100 of the present embodiment includes the plurality of linear electrodes 30a to 30k in the imaging region 130A in the liquid crystal panel 200. Then, in the plurality of linear electrodes 30a to 30k, by forming the electric field of transverse direction between a pair of neighboring linear electrodes, a liquid crystal layer 220B is used as an optical shutter. At this time, a plurality of distances of the intervals P1 to P3 are provided as a pair of intervals of the linear electrode. The plurality of intervals P1 to P3 are randomly distributed within the imaging region 130A. With such a configuration, the display device 100 of the present embodiment can reduce the occurrence of the ghost in the captured image.

Second Embodiment

In the first embodiment, an example that the voltages of +V volts and −V volts are alternately applied to the plurality of linear electrodes 30a to 30k is shown. However, since the plurality of linear electrodes 30a to 30k are separated from each other by the plurality of different intervals P1 to P3, there is a difference in the strength of the formed electric field when the same voltage differential is supplied between the pair of linear electrodes. The differences in electric field strengths may also affect the orientation of the liquid crystal layer 220B, resulting in a change in the optical transmittance. Therefore, in the display device 100 of the first embodiment, although the occurrence of the ghost in the imaging region 130A can be reduced, the difference in the light transmittance due to the difference in the light transmission pitches may be visually recognized as luminance unevenness.

In this embodiment, the display device 100 of the first embodiment is further improved. That is, a display device 100a according to the present embodiment supplies different voltages to the plurality of linear electrodes 30a to 30k to make the voltage differences between the linear electrodes different according to the intervals between each linear electrode. By doing this, in the display device 100a of the present embodiment, the electric field strength formed between the linear electrodes of the plurality of linear electrodes 30a to 30k is made substantially constant. Therefore, in the display device 100a, the light transmittance between the linear electrodes is substantially constant, and the brightness distributions in the imaging region 130A are improved. Here, the term "substantially constant" includes not only the case of perfect coincidence but also the case of voltage difference between the linear electrodes within ±3V (preferably ±1V). The present embodiment will be described focusing on points different from the first embodiment. Therefore, the same configuration as the first embodiment may be omitted by indicating the same reference numerals.

Figure 7:
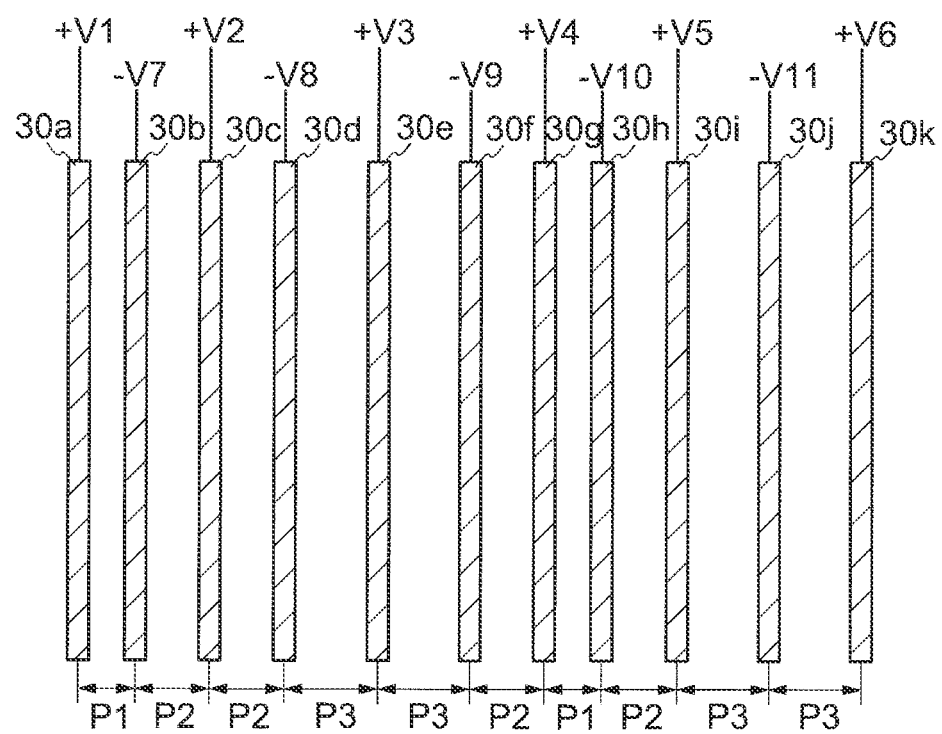
FIG. 7 is a plan view schematically showing a configuration of an imaging region in a liquid crystal panel of the second embodiment.

FIG. 7 is a plan view schematically showing a configuration of the imaging region 130A in the display device 100a according to the second embodiment. In the display device 100a of the present embodiment, similarly to the first embodiment, the plurality of linear electrodes 30a to 30k is arranged in the imaging region 130A at the intervals P1 to P3 differing from each other. However, in the present embodiment, for the plurality of linear electrodes 30a to 30k, respectively, a positive power supply voltage (+V1 to +V6) and a negative power supply voltage (−V7 to −V11) is supplied.

In this case, the plurality of linear electrodes 30a, 30c, 30e, 30g, 30i, and 30k to which the positive power supply voltage is supplied may be independently supplied with the positive power supply voltage or may have some linear electrodes sharing the positive power supply voltage. The plurality of linear electrodes 30b, 30d, 30f, 30h, and 30j to which the negative power supply voltage is supplied may be independently supplied with the negative power supply voltage or may have some linear electrodes sharing the negative power supply voltage.

In any case, in the present embodiment, the voltage difference (E1) between the first pair of linear electrodes separated by the first interval P1, the voltage difference (E2) between the second pair of linear electrodes separated by the second interval P2, and the voltage difference (E3) between the third pair of linear electrodes separated by the third interval P3 are controlled to be different according to the intervals between each linear electrodes. As a result, in the display device 100a of the present embodiment, the electric field strength formed between the plurality of linear electrodes 30a to 30k become substantially constant, and the luminance unevenness in the imaging region 130A can be reduced.

A plurality of power supply lines that supply different voltages may be provided to supply different voltages to each of the plurality of linear electrodes 30a to 30k. However, preparing a plurality of power supplies increases costs. Therefore, for example, one voltage may be converted into a plurality of other voltages using a wiring resistance or the like, and each voltage may be supplied to each of the linear electrodes 30a to 30k. Specifically, it is sufficient to appropriately adjust the width and length of the wiring for supplying the power supply voltage so that the finally required voltage is supplied to the linear electrodes.

Third Embodiment

In the first embodiment and the second embodiment, the imaging region 130A is provided with the plurality of linear electrodes 30a to 30k so as to function as optical shutters. The display region 130B is provided with the common electrode 304 and the pixel electrode 306 (specifically, the linear electrode 306A) so as to function as the plurality of pixels 212. However, the present invention is not limited to these examples, and similarly to the display region 130B, the imaging region 130A may be provided with a plurality of pixels so that images can be displayed.

For example, among the plurality of linear electrodes 30a to 30k shown in FIGS. 6 and 7, the linear electrodes (e.g., linear electrode 30a, 30c, 30e, 30g, 30i, and 30k, etc.) connected to the positive power supply voltage may be the pixel electrodes, and the linear electrodes (e.g., linear electrode 30b, 30d, 30f, 30h, and 30j, etc.) connected to the negative power supply voltage may be the common electrodes to form a pixel construction. In this case, like the pixel structure shown in FIG. 3, elements such as the thin film transistor 302, the R filter 308R, the G filter 308G, the B filter 308B, and the light shielding film 309 may be provided in the imaging region 130A.

For example, when the plurality of pixels having the pixel structure shown in FIG. 3 is provided in the imaging region 130A, the configuration described in the first embodiment may be applied to the plurality of the linear electrodes 306A functioning as the pixel electrode 306. That is, the plurality of linear electrodes 306A may be configured to be arranged in a plurality of interval differing from each other, and the plurality of interval may be configured to be irregularly distributed in the imaging region 130A.

Figure 8:
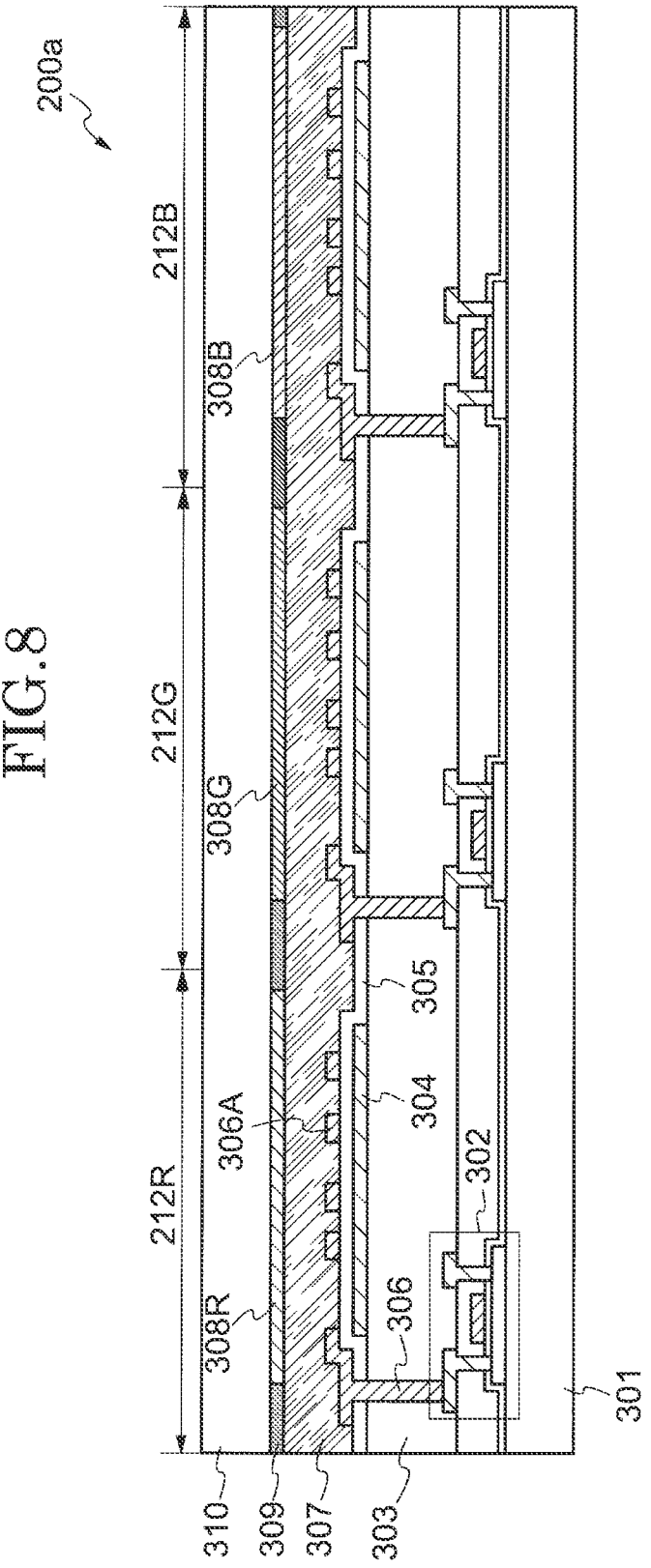
FIG. 8 is a cross-sectional view showing a configuration of an imaging region in a liquid crystal panel of the third embodiment.

FIG. 8 is a cross-sectional view showing a configuration of a pixel in a liquid crystal panel 200a of the third embodiment. In the embodiment shown in FIG. 8, the plurality of linear electrodes 306A is not arranged at equal intervals but arranged irregularly. As a result, it is possible to reduce a phenomenon in which the light incident from the outside at the time of imaging is diffracted by the plurality of linear electrodes 306A.

As described above, according to the present embodiment, when imaging is not performed, images can be displayed using the imaging region 130A and the display region 130B. When imaging is performed, as described in the first embodiment, the backlight of the imaging region 130A is turned off, and the liquid crystal layer 220B is controlled to be in the transmissive state.

Each of the embodiments described above as an embodiment of the present invention can be appropriately combined and implemented as long as they do not contradict each other. It is also within the scope of the present invention that a person skilled in the art adds, deletes, or changes designs of constituent elements, or adds, omits, or changes conditions of steps as appropriate based on the display device of the respective embodiments, as long as the gist of the present invention is provided.

Even if it is other working effects which differ from the working effect brought about by the mode of each above-mentioned embodiment, what is clear from the description in this specification, or what can be easily predicted by the person skilled in the art is naturally understood to be brought about by the present invention.

What is claimed is:
1. A device comprising:
   a liquid crystal panel including a plurality of pixels; and
   an imaging unit arranged on a back side of the liquid crystal panel, wherein
   the liquid crystal panel includes a display region and an imaging region adjacent to the display region in a plan view;

the liquid crystal panel includes a plurality of electrodes arranged separately from each other in the imaging region, and pixel electrodes in the display region;

the plurality of electrodes of the liquid crystal panel overlaps with the imaging unit in a plan view;

among the plurality of electrodes, a first pair of directly adjacent electrodes are separated in the first direction with a first interval and a second pair of directly adjacent electrodes are separated in the first direction with a second interval different from the first interval in the plan view, the first pair of directly adjacent electrodes and the second pair of directly adjacent electrodes are irregularly arranged, the first pair of directly adjacent electrodes are arranged in a same layer, and the second pair of directly adjacent electrodes are arranged in a same layer.

2. The device according to claim 1, wherein a first voltage applied between the first pair of directly adjacent electrodes is a voltage different from a second voltage applied between the second pair of directly adjacent electrodes.

3. The device according to claim 2, wherein the first interval is wider than the second interval, and the first voltage is higher than the second voltage.

4. The device according to claim 1, wherein among the plurality of electrodes, a third pair of directly adjacent electrodes are separated in the first direction with a third interval different from the first interval and the second interval in the plan view.

5. The device according to claim 4, wherein a third voltage applied between the third pair of directly adjacent electrodes is a voltage different from the first voltage applied between the first pair of directly adjacent electrodes and the second voltage applied between the second pair of directly adjacent electrodes.

6. The device according to claim 5, wherein the third interval is narrower than the second interval, and the third voltage is lower than the second voltage.

* * * * *